Oct. 10, 1961  J. W. HIGGINBOTHAM  3,003,697
SINE WAVE GENERATOR WITH PHASE ANGLE CONTROL
Filed May 28, 1956

INVENTOR
JOHN W. HIGGINBOTHAM
BY
Julian C. Renfro
ATTORNEY

United States Patent Office 3,003,697
Patented Oct. 10, 1961

3,003,697
SINE WAVE GENERATOR WITH PHASE ANGLE CONTROL
John W. Higginbotham, Essex, Md., assignor to The Martin Company, Middle River, Md., a corporation of Maryland
Filed May 28, 1956, Ser. No. 587,689
3 Claims. (Cl. 235—186)

This invention relates to the generation of electrical wave forms and more particularly to apparatus for generating a voltage which is proportional to the function sin $(\omega t + \theta)$.

It is frequently desirable in electrical engineering and research work to have available a sine wave reference voltage, the frequency, $\omega$, and phase, $\theta$, of which are continuously variable. A voltage of this kind is often used as a base or reference signal in oscilloscopic analysis. Presently known apparatus for generating voltages having amplitudes proportional to the function, sin $(\omega t + \theta)$, utilize combinations of autosyns to modulate a relatively high frequency carrier at the desired low frequency, $\omega$. The phase angle $\theta$ is introduced into the signal by mechanical arrangements for shifting the frames of the autosyns relative to each other. The modulated carrier is then demodulated to eliminate the carrier frequency. Such apparatus obviously is expensive, complicated, and bulky which makes it ill-adapted to common requirements of test apparatus such as portability and good reliability under field conditions.

The trigonometric identity sin $$(A \pm B) = \sin A \cos B \pm \cos A \sin B$$

is, of course, well known. However, it would appear that any attempt to utilize this relation in any apparatus to generate a voltage proportional to the sine of the sum of two angles would immediately lead to a complication of sine wave generators, multipliers, and adders such that the complete apparatus would be impractically complex, bulky and unreliable. As a consequence, other techniques for obtaining the desired result have been tried, among them being the autosyn apparatus mentioned above. The results have been quite unsatisfactory and have prompted me to re-examine the possibility of a solution based on this well-known trigonometric identity.

I have now invented a uniquely simple means for modulating a voltage or generating a voltage so that its amplitude varies according to the function sin $(\omega t + \theta)$. According to my invention in its broadest aspect I provide means for producing two voltages which are instantaneously proportional to sin $\omega t$ and cos $\omega t$, respectively. I have recognized that, since the absolute values of the sine and cosine functions never exceed one, that part of the identity which appears to require two steps of multiplication, i.e., the generation of the products sin $\omega t \cos \theta$ and cos $\omega t \sin \theta$, can be accomplished merely by attenuation of the voltages representative of sin $\omega t$ and cos $\omega t$. Therefore, I also provide means for attenuating the sin $\omega t$ voltage proportionally to cos $\theta$ where $\theta$ is the desired angle of phase shift, and additional means for attenuating the cos $\omega t$ voltage proportionally to sin $\theta$. The two attenuated voltages are then applied to suitable means for producing the algebraic sum of the voltages and this sum is proportional to sin $(\omega t + \theta)$.

It is a feature of my invention that it can be constructed from simple and reliable components which are commercially available.

It is a further feature of my invention that it may be constructed from purely passive resistive elements which do not introduce any undesired phase shift. The desired alteration of the function due to the variable $\theta$ may be brought about solely by resistive attenuation.

A complete understanding of my invention may be had from the following description of a particular embodiment of the invention. In the description, reference is made to the accompanying drawing of which:

Figure 1:
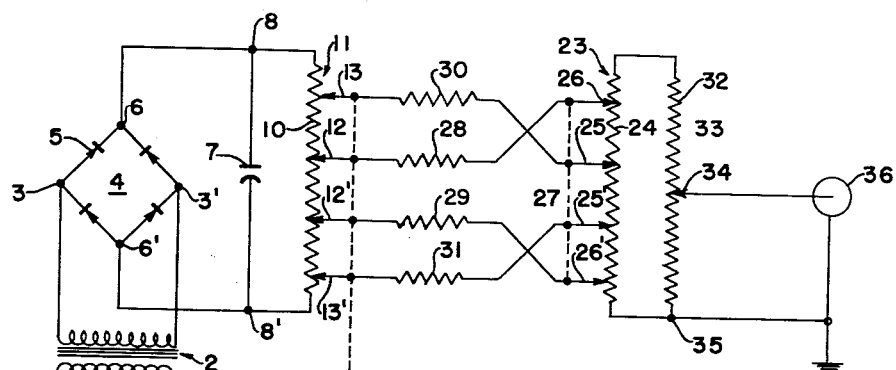
FIG. 1 is a schematic representation of a sine wave generator.

A source of D.C. voltage is derived from an A.C. source connected at the terminals 1 to the primary winding of a stepdown transformer 2. The secondary winding of the transformer is connected to the input terminals 3, 3' of a full wave rectifier 4 which comprises four selenium rectifiers 5. The output voltage of the rectifier, taken from the terminals 6, 6', is connected across a filter capacitor 7 or other suitable filtering network to remove any residual A.C. ripple from the D.C. voltage.

The filtered output voltage available at the terminals 8, 8' is connected across the resistance element 10 of a combination sine-cosine potentiometer indicated generally at 11. This potentiometer has four movable contacts adapted to engage the wound resistance element. For convenience of description, the pair of contacts indicated in the schematic of FIG. 1 as 12 and 12' will be designated the sine taps and the remaining pair of contacts indicated at 13, 13' will be designated the cosine taps.

Before proceeding with the description of the schematic arrangement of FIG. 1 a description will be given of a kind of potentiometer which I have found to be particularly useful in this particular embodiment. Referring then to FIG. 2 the potentiometer 11 comprises a flat card 14 on which is wound a single layer of resistance wire 15 (10 in FIG. 1), the leads to the resistance wire being indicated at 16, 16'. A yoke, having four radial arms 17, 18, 19, and 20, is carried on a shaft 21 to rotate about the axis of the shaft which is normal to the plane of FIG. 2. At the extremities of the arms 17-20 there are small brushes or contacts which engage the resistance element 15 of the potentiometer along the circumference of a circle centered on the shaft 21. For the purposes of this description the pair of diametrically opposite brushes carried by the arms 17 and 19 will be designated the sine taps 12 and 12' to correspond with the schematic diagram of FIG. 1. Accordingly, the diametrically opposite brushes carried by the arms 18 and 20 will be called the cosine taps of the potentiometer and are shown at 13 and 13', respectively. The contacts are connected to separate collector rings on the shaft 21 and brushes are utilized to pick off the voltages from the rings.

The potentiometer functions in the following manner. When the yoke is made to rotate about the axis of the shaft 21 at some rate $\omega$ radians per second, it is apparent that the taps at the ends of the arms 17-20 will be carried around a circular path on the face of the winding. As the yoke rotates, the amount of resistance between the pair of sine taps will vary from a minimum to a maximum in the course of rotation of the yoke through 90 degrees or $$\frac{\pi}{2}$$

radians. Then, when the winding 15 is connected to a source of voltage, the voltage drop through the resistance between the taps 17 and 19 will vary accordingly from a minimum to a maximum, and in fact, will vary according to the sine of the angle between the line through the pair of contacts 12 and 12' at any given time and their position when there is minimum resistance between the pair of taps. The sine taps have maximum resistance between them when they are at opposite ends of the winding 15 as shown in FIG. 2. Moreover, the polarity of the voltage drop will change after the taps have been displaced by 180 degrees which is in accordance with the reversal of sine of an angle greater than 180 degrees.

It is now apparent that when the sine taps 12 and 12' intercept minimum resistance, the other pair of taps 13 and 13' will intercept maximum resistance. Accordingly, the voltage drop between the pair of sine taps 12 and 12' will correspond to the value of the sine of 0 radian while the voltage drop between the pair of cosine taps 13 and 13' will be a maximum and will corespond to 1, the value of the cosine of zero radian. In any other angular position of the yoke, the voltage drop across the taps 12 and 12' will be proportional to the sine of the angle of the displacement of the taps from the reference position of $\sin^{-1} 0$, while the voltage drop across the taps 13 and 13' will be proportional to the cosine of the same angle.

Figure 2:
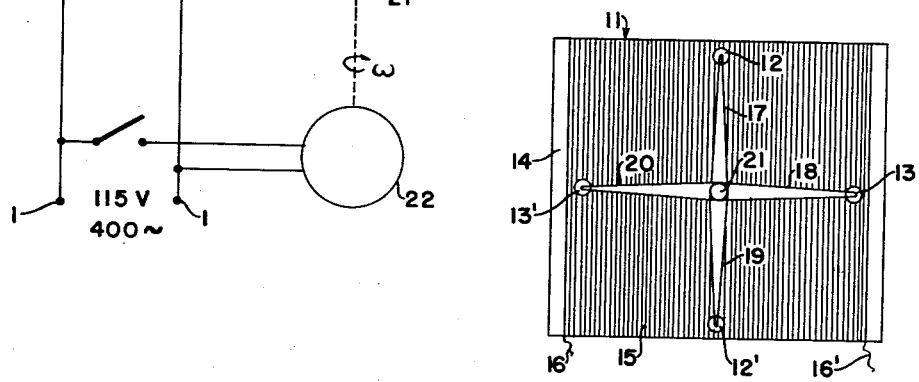
FIG. 2 is a plan view of a sine-cosine potentiometer used in the generator of FIG. 1.

Returning now to the description of FIG. 1, the shaft 21 carrying the arms 17–20 and the pairs of taps 12, 12' and 13, 13' is driven by a variable speed device such as a motor 22 energized from the 400-cycle source connected to terminals 1, 1'. With appropriate speed control for the motor the angular rate of displacement, $\omega$, of the movable taps may be continuously varied from 0 to the maximum speed of the motor. Accordingly, the voltage across the pair of taps 12 and 12' will vary according to $\sin \omega t$ while the voltage across the pair of taps 13 and 13' will vary according to $\cos \omega t$.

A second combination sine-cosine potentiometer 23 is provided for introducing the equivalent of the phase shift in the function, $\sin (\omega t + \theta)$. This potentiometer 23 is identical in construction to the potentiometer 11 which was described in detail in connection with FIG. 2. Here the resistance element is indicated at 24, the sine taps are indicated at 25 and 25' and the cosine taps are indicated at 26 and 26'. That the taps are mechanically linked together to be simultaneously displaced is indicated by the mechanical connection 27. Any desired phase shift with respect to an arbitrary reference may be manually set in by the adjustment of this potentiometer.

Now in accordance with the principle of my invention which requires that the $\sin \omega t$ voltage be attenuated proportionally to the cosine of the phase angle, $\theta$, I connect the sine tap 12 of the potentiometer 11 to the cosine tap 26 through an isolating resistance 28 and I connect the sine tap 12' to the cosine tap 26' through an isolating resistance 29. Similarly, the pair of cosine taps 13 and 13' of the potentiometer 11 are connected respectively to the pair of sine taps 25 and 25' through isolation resistances 30 and 31. As is well understood in the art, these isolation resistances are to minimize the current drain in the circuit and they will be of a suitably large value. Preferably all of the resistances 28–31 are of the same value.

In this embodiment the potentiometer 23 serves to simultaneously attenuate the $\sin \omega t$ and $\cos \omega t$ voltages and to sum algebraically the attenuated voltages. The resistance element 24 of the potentiometer 23 is connected across a voltage divider 32 having a resistance element 33 and a movable tap 34. The tap 34 and one terminal 35 of the resistance element 33 are connected to a suitable output jack 36. This arrangement permits the sin $$(\omega t + \theta)$$

voltage appearing at the terminals of the resistance element 24 to be divided down by any desired factor.

From the foregoing description it is apparent that I have invented an extremely simple means for generating a voltage which is proportional to $\sin (\omega t + \theta)$ where both the frequency, $\omega$, and the phase shift, $\theta$, are continuously variable by manual adjustments throughout their full ranges. Because all of the elements of the circuitry are resistances and may be made to have limited amounts of self-induction, the circuitry itself does not introduce any appreciable amount of phase shift other than that which is intended by the adjustment of the phase shift potentiometer.

It is also apparent that apparatus of this type is not limited to D.C. excitation. If, for example, it is required to produce an alternating current carrier which is amplitude modulated in accordance with the function $\sin (\omega t + \theta)$ the resistance element 10 of the potentiometer 11 may be energized by an A.C. voltage such as 115 volts at 400 cycles instead of D.C. The remainder of the circuit is used as it is shown in FIG. 1.

The foregoing description of a particular embodiment of my invention is given solely for purposes of illustration and I do not intend to be limited to the details thereof. The scope of the invention is defined by the following claims.

I claim:

1. Apparatus for modulating a voltage according to the function $\sin (\omega t + \theta)$ which comprises first and second sine-cosine potentiometers each comprising a wound resistance element and four movable taps adapted to contact said element along a circular locus at intervals of $$\frac{\pi}{2}$$

radians, a source of voltage connected to the resistance element of said first potentiometer, means for driving the taps of said first potentiometer along their locus at a rate proportional to $\omega$, means for electrically coupling the sine and cosine taps of said first potentiometer respectively to the cosine and sine taps of said second potentiometer, means for displacing the taps of said second potentiometer by an amount proportional to $\theta$ from their positions corresponding to $\sin^{-1} 0$, and output terminals for connecting utilization means across the resistance element of said second potentiometer.

2. Apparatus for modulating a voltage according to the function $\sin (\omega t + \theta)$ which comprises a first sine potentiometer and a first cosine potentiometer each having at least one movable tap, means for displacing the movable taps of said first potentiometers at a rate proportional to $\omega$, a second sine potentiometer and a second cosine potentiometer, each having at least one movable tap, means for displacing the movable taps of said second potentiometers by an amount proportional to $\theta$ from their positions corresponding to $\sin^{-1} 0$ and $\cos^{-1} 1$ respectively, means for coupling the tap of said first sine potentiometer to the tap of said second cosine potentiometer, means for coupling the tap of said first cosine potentiometer to the tap of said second sine potentiometer, said means for coupling having impedances substantially equal to each other, a source of voltage for energizing said first potentiometers, and means for algebraically summing the voltages developed in said second potentiometers.

3. Apparatus for modulating a voltage according to the function $\sin (\omega t + \theta)$ which comprises a pair of potentiometers, each of which has a resistance element and four movable taps adapted to engage the element such that the resistance between one pair of taps is continuously variable and proportional to the sine of the displacement of the taps from their positions corresponding to $\sin^{-1} 0$ and that the resistance between another pair of taps is continuously variable and proportional to the cosine of their displacement from their positions corresponding to $\cos^{-1} 1$, means for coupling the sine taps of the first potentiometer to the cosine taps of the second potentiometer and means for coupling the cosine taps of the first potentiometer to the sine taps of the second potentiometer, a source of voltage connected to the resistance element of the first potentiometer, output terminals for connecting utilization means across the resistance element of the second potentiometer, means for displacing the taps of the first potentiometer, at a rate proportional to $\omega$ and means for displacing the taps of said second sine and cosine potentiometers by an amount proportional to $\theta$ from their positions corresponding to $\sin^{-1} 0$ and $\cos^{-1} 1$, respectively.

References Cited in the file of this patent

UNITED STATES PATENTS

| | | |
|---|---|---|
| 2,408,081 | Lovell et al. | Sept. 24, 1946 |
| 2,471,315 | Dehmel | May 24, 1949 |
| 2,549,389 | Rosenberg | Apr. 17, 1951 |
| 2,688,442 | Droz et al. | Sept. 7, 1954 |
| 2,722,659 | Dickey et al. | Nov. 1, 1955 |

OTHER REFERENCES

Chance et al.: Waveforms, McGraw-Hill Publishing Co., New York (1949). (Copies in Div. 23 and Scientific Library, pages 434–436.)